United States Patent
Singh

(12) 
(10) Patent No.: US 6,234,680 B1
(45) Date of Patent: May 22, 2001

(54) SEALABLE BEARING RACE ASSEMBLY

(75) Inventor: Gurinder Singh, Carson City, NV (US)

(73) Assignee: William Doty Jagger, Laguna Beach, CA (US)

( * ) Notice: Subject to any disclaimer, the term of this patent is extended or adjusted under 35 U.S.C. 154(b) by 0 days.

(21) Appl. No.: 09/488,885

(22) Filed: Jan. 21, 2000

(51) Int. Cl.$^7$ .................................................... B62K 21/06
(52) U.S. Cl. ....................... 384/607; 384/477; 384/483; 280/279
(58) Field of Search .................................... 384/607, 479, 384/481, 483, 545, 477; 74/551.1; 280/279

(56) References Cited

U.S. PATENT DOCUMENTS 5,095,770    3/1992   Rader, III .

OTHER PUBLICATIONS

Durametallic Corporation; "Magnetic Seal for Positive Bearing Protection"; Form 582A No Date.
Durametallic Corporation; "The X–Series Cartridge Mounted Dura Seal"; Form 566A 1987.
Pac–Seal Inc. International; "Replacement Seal Guide"; Catalog No. 1193 No Date.
E&G Sealol; Engineered Products Division; "Engineered Excellence"; Copyright 1984.

*Primary Examiner*—Thomas R. Hannon
(74) *Attorney, Agent, or Firm*—Stetina Brunda Garred & Brucker

(57) ABSTRACT

A sealable bearing race assembly including a first component and a second component cooperatively mateable with each other to yield a sealed bearing assembly. The first component has a first circular channel for accommodating a bearing structure such as a plurality of ball bearings, and flanked by a first lateral flat border and a first medial flat border. The first lateral flat border has a first biaser there behind for urging that border away from an underlying first support. The second component has a second circular channel alignable with the first channel, and is flanked by a second lateral flat border and a second medial flat border. The second medial flat border has a second biaser there behind for urging that border away from an underlying second support. In operation, a sealed bearing assembly so formed from the race assembly houses the bearing structure within the aligned first and second channel while maintaining under a positive pressure the mating lateral and medial flat borders of the two components thereof to thereby produce a surface-to-surface mechanical seal.

13 Claims, 2 Drawing Sheets

SEALABLE BEARING RACE ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

This invention relates in general to bearing race assemblies, and in particular to a generally environmental-proof sealable bearing race assembly in which sealing of a bearing structure is accomplished with a mechanical seal maintained in place with biasing material positioned to cause positive pressure of seal-mating surfaces against each other.

BACKGROUND OF THE INVENTION

A need for bearing race assemblies that are truly sealable to thereby render an efficient lifetime of bearing operation before repacking or replacing is present in a number of applications. Unfortunately, many assembly constructions are described as "sealed," but, in fact, do not provide reasonable longevity in day-to-day operations. Such present approaches primarily include bearing structures with rubber dust shields, O-rings, lip seals, grease within near-zero gap housings, labyrinths, and other similar provisions. As is thus apparent, current attempts for protecting bearing structures such as ball bearings primarily involve the addition of sealing materials to housings or race assemblies in which the bearing structures reside rather than making the race assembly itself a part of the seal structure. As a result, moisture, dirt, and other contaminants find their way past these sealing materials and into contact with the bearing structure after a relatively short period of exposure in a working environment. When this occurs, the bearing structure loses its utility and must be replaced or, minimally, repacked with lubricant within its race assembly and once again sealed with an identical potentially short-lived sealing product.

One particular environment in which a sealed bearing product is greatly important is that of the headset component of a bicycle. Traditionally, headset units are common maintenance items because they provide critical handling characteristics for a rider. When a bicycle is involved in racing, cross-country touring, mountain climbing, or other strenuous activities, its headset unit is easily exposed to untoward environmental impact including dust, rain, surface impact, and other potentially damaging factors. Present units attempt to provide bearing protection by using rubber shields, lip seals, or o-ring seals at junction sites of headset construction, with the latter two seals functioning as "contact seals" since two opposing headset surfaces contact opposing sides of the seal structures. Such contact is minimal, however, and is generally equivalent to the width of a pencil line. Another type of seal is a non-contact seal, referred to as a "near-zero gap" seal, between moving and fixed parts where grease is provided as an interface. In each of the above approaches, however, protection of bearing structures within the headset race assembly breaks down because the respective seal constructions do not provide a barrier sufficiently adequate to withstand environmental contaminants.

In view of the above-described criticality of sufficient bearing structure sealing, it is apparent that a need is present for a sealable bearing race assembly having a seal-structure configuration that adequately repels untoward environmental impact. Accordingly, a primary object of the present invention is to provide a bearing race assembly wherein housing components thereof sealingly mate over a contact area sufficiently configured to significantly inhibit invasive contaminants.

Another object of the present invention is to provide a bearing race assembly wherein mating surfaces are flat and are resiliently biased against each other.

Yet another object of the present invention is to provide a sealed bearing assembly wherein ball bearings ride within a channel defined by opposing borders biasly maintained against complimentary borders of a mating assembly component also provided with a complimentary channel wherein the ball bearings likewise ride.

These and other objects of the present invention will become apparent throughout the description thereof which now follows.

BRIEF SUMMARY OF THE INVENTION

The present invention is a sealable bearing race assembly comprising a first component and a second component cooperatively mateable with each other to yield a sealed bearing assembly. The first component comprises a first circular channel for accommodating a bearing structure such as a plurality of ball bearings. The channel is flanked by a first lateral flat border and a first medial flat border, with the first lateral flat border having a first biaser there behind for urging that border away from an underlying first support. The second component comprises a second circular channel alignable with the first circular channel, and is flanked by a second lateral flat border and a second medial flat border. The second medial flat border has a second biaser there behind for urging that border away from an underlying second support.

In operation, the first and second lateral flat borders and first and second medial flat borders are preferably formed of metal and are positionable in respective contact with each other such that the resulting contacts are positively maintained by the first biaser urging the first lateral border against the second lateral border and by the second biaser urging the second medial border against the first medial border. A sealed bearing assembly so formed houses the bearing structure within the aligned first and second channel while maintaining under a positive pressure the mating lateral and medial flat borders of the two components thereof to thereby produce a surface-to-surface mechanical seal without the presence of an interfacing or covering material whose structural characteristics fail to adequately inhibit admission of contaminants into bearing structure presence.

BRIEF DESCRIPTION OF THE SEVERAL VIEWS OF THE DRAWING

An illustrative and presently preferred embodiment of the invention is shown in the accompanying drawings in which.

DETAILED DESCRIPTION OF THE INVENTION

Figures 1, 2, 3:
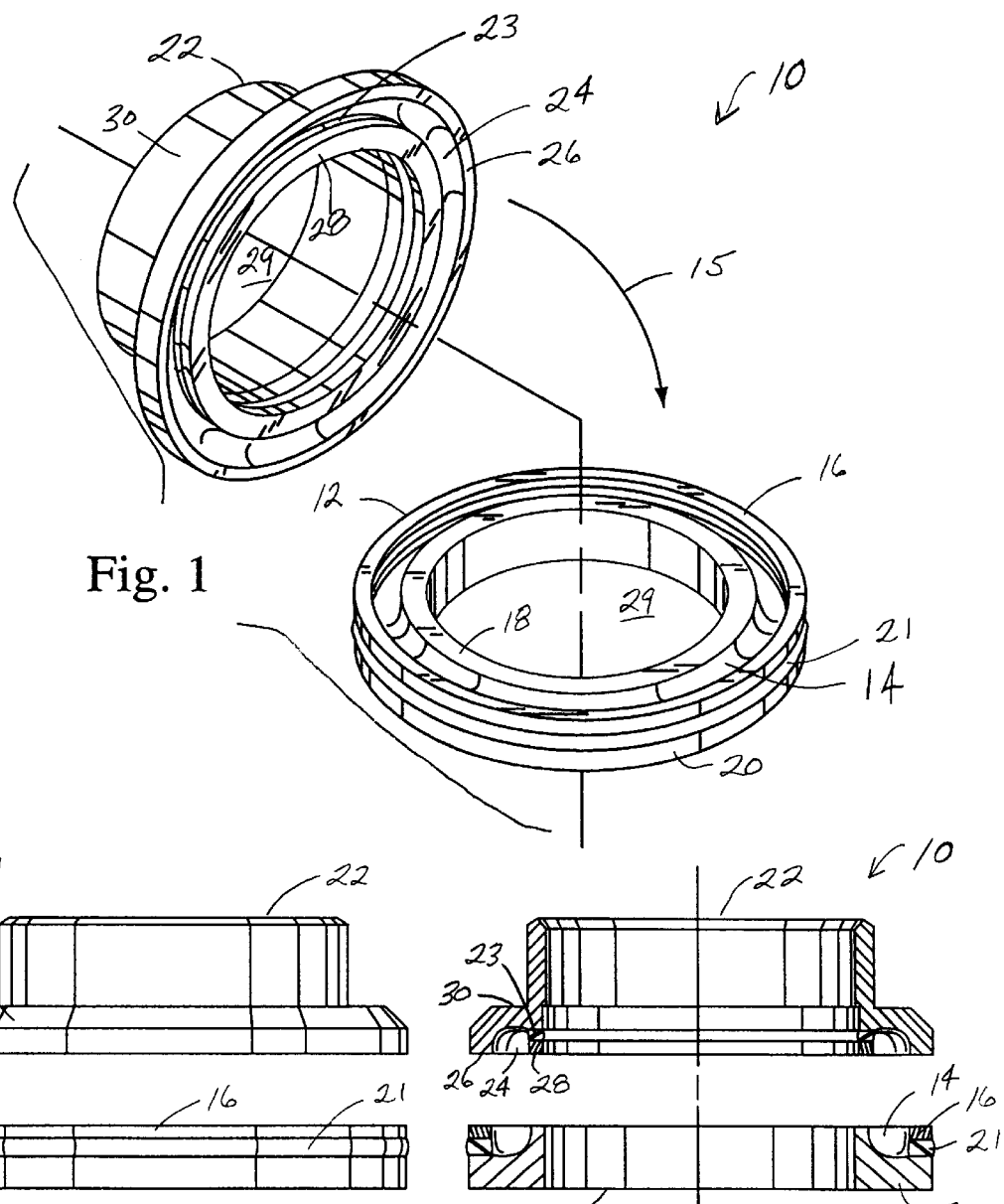
FIG. 1 is a perspective view illustrating the two components of a sealable bearing race assembly.
FIG. 2 is a side elevation view of the two components of the bearing race assembly of FIG. 1.
FIG. 3 is a side elevation view in cross section of the two components as shown in FIG. 2.

Referring to FIGS. 1–3, a disassembled sealable bearing race assembly 10 is shown. The assembly 10 includes a first component 12 having a circular first channel 14 for accommodating a bearing structure (not shown) non-limitedly exemplified as a plurality of individual ball bearings or roller bearings, and flanked on one side by a flat first lateral border 16 and on the other side by a flat first medial border 18. Situated behind the first lateral border 16 is a biaser here exemplified as elastomeric material 21 such as a foam polymer, resilient rubber, or other like material as would be recognized in the art urging the first lateral border 16 away from an underlying first support 20. Non-limiting other biasing means could include bellow, coil spring, and wave washer devices as would be recognized by a skilled artisan. A second component 22 of the assembly 10 includes a circular second channel 24 alignable with the first channel 14. This second channel 24 is flanked on one side by a flat second lateral border 26 and on the other side by a flat second medial border 28, with the second medial border 28 having disposed there behind elastomeric material 23 as earlier exemplified urging the second medial border 28 away from an underlying second support 30. Except for the elastomeric material 21, 23, both components 12, 22 are preferably constructed of a hard wear-resistant material such as a hard metal or a ceramic material, with the first lateral border 16 and second medial border 26 most preferably constructed of a self-lubricating material such as bearing bronze, carbon, or a polymer such as DELRIN, TEFLON, or the like in accordance with mechanical seal art. The race assembly 10 here shown is especially suitable for use in a bicycle headset (not shown) and therefore is configured with circular first and second lateral borders 16, 26, and circular first and second medial borders 18, 28 that create a circular central void 29 for headset application. An arrow 15 in FIG. 1 illustrates assembly procedure for associating the two components 12, 22 in producing a sealed bearing assembly 32 (FIG. 4).

Figure 4:
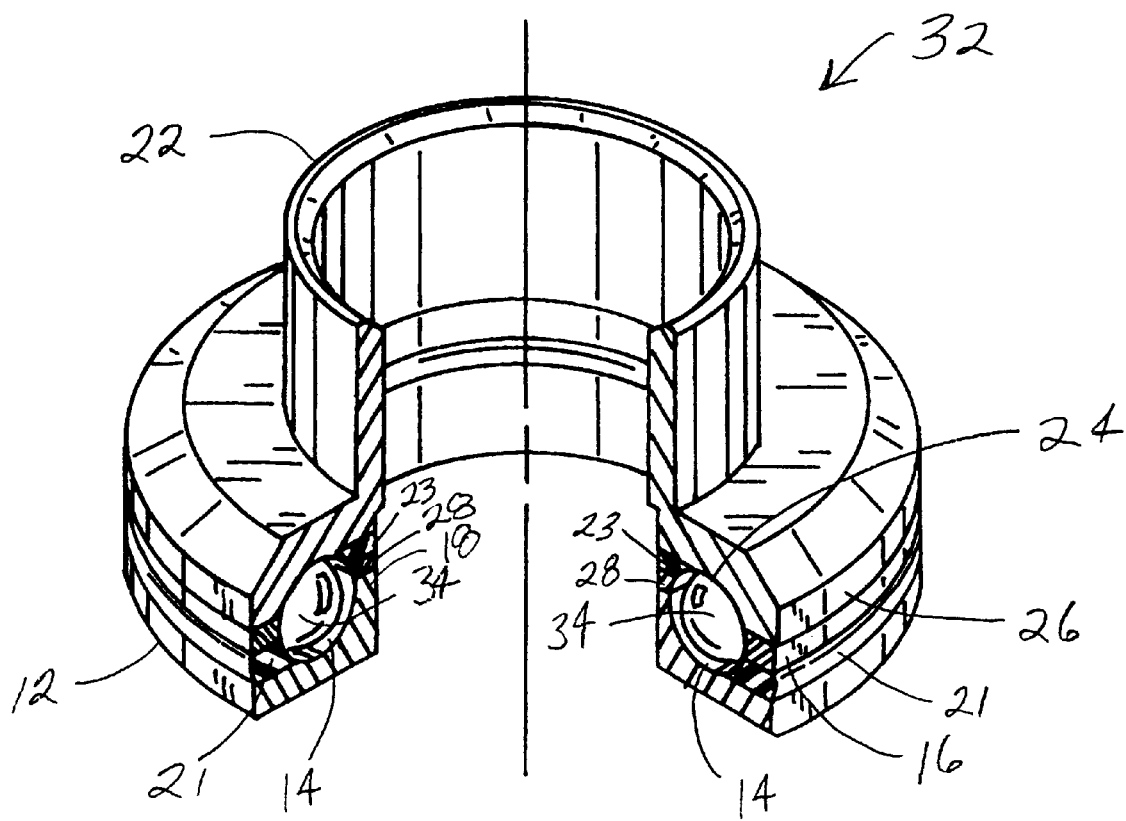
FIG. 4 is a perspective view in section of a sealed bearing assembly employing the elements of FIG. 1.

FIG. 4 shows a sealed bearing assembly 32 constructed from the race assembly 10 of FIG. 1 and including a bearing structure here being a plurality of standard ball bearings 34 disposed within the aligned first and second circular channels 14, 24. This operational assembly 32 illustrates an assembled configuration wherein first and second lateral borders 16, 26 and first and second medial borders 18, 28 are in contact with each other to thereby form a sealed housing for the ball bearings 34. Because of the resiliency of the elastomeric material 21, 23 situated respectively behind the first lateral border 16 and second medial border 28, these first lateral and second medial borders 18, 28 are urged and biased against their respectively adjacent second lateral and first medial borders 26, 18 to thereby maintain a tight metal-to-metal seal of the flat surfaces of the respective borders 16, 18, 26, 28. In this manner, the ball bearings 34 situated within the aligned circular channels 14, 24 are protected from environmental contaminants since such contaminants are not provided with a seal material which breaks down to allow direct or seepage passage of such contaminants. Use of bearing bronze for the borders 16, 28 behind which the elastomeric material 21, 23 resides is most preferred because bronze can superiorly provide a truly flat surface for enhancing a non-porous metal-to-metal sealing interface. The ball bearings 34 are typically surrounded (packed) with a lubricant which can be replaced when so required by merely disassembling the sealed bearing assembly 32, removing the lubricant, cleaning the ball bearings 34 and aligned circular channels 14, 24 as necessary, introducing new lubricant, and reassembling the race assembly 10 in a sealed configuration to thereby re-establish a sealed bearing assembly 32 protected with a significant surface area of metal-to-metal contact for an effective surface-to-surface mechanical seal.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A sealable bearing race assembly suitable for use in a bicycle, comprising:
    a) a first component comprising a first circular channel for accommodating a bearing structure, said channel flanked by a first lateral flat border and a first medial flat border, with said first lateral flat border having a first biaser there behind for urging said first lateral flat border away from an underlying first support; and
    b) a second component comprising a second circular channel alignable with the first circular channel, said second channel flanked by a second lateral flat border and a second medial flat border, with said second medial flat border having a second biaser there behind for urging said second medial flat border away from an underlying second support, whereby said first and second lateral flat borders and said first and second medial flat borders are positionable in contact with each other such that said contacts are positively maintained by said first biaser urging the first lateral border against the second lateral border and by said second biaser urging the second medial border against the first medial border.

2. A sealable bearing race assembly as claimed in claim 1 wherein the biasers are formed of an elastomeric material.

3. A sealable bearing race assembly as claimed in claim 1 wherein all said borders are formed of metal.

4. A sealable bearing race assembly as claimed in claim 3 wherein the first lateral border and second medial border are formed of bronze.

5. A sealable bearing race assembly as claimed in claim 1 wherein first and second medial borders are circular.

6. A sealable bearing race assembly as claimed in claim 5 wherein first and second lateral borders are circular.

7. A sealed bearing assembly comprising:
    a) a first component comprising a first circular channel, said channel flanked by a first lateral flat border and a first medial flat border, with said first lateral flat border having a first biaser there behind urging said first lateral flat border away from an underlying first support; and
    b) a second component comprising a second circular channel in alignment with the first circular channel, said second channel flanked by a second lateral flat border and a second medial flat border, with said second medial flat border having a second biaser there behind for urging said second medial flat border away from an underlying second support; and
    c) a bearing structure disposed within said aligned first and second channels, whereby said first and second lateral flat borders and said first and second medial flat borders are in contact with each other and wherein said contacts are positively maintained by said first biaser urging the first lateral border against the second lateral border and by said second biaser urging the second medial border against the first medial border.

8. A sealed bearing assembly as claimed in claim 7 wherein the biasers are formed of an elastomeric material.

9. A sealed bearing assembly as claimed in claim 7 wherein the bearing structure comprises a plurality of ball bearings.

10. A sealable bearing race assembly as claimed in claim 7 wherein all said borders are formed of metal.

11. A sealed bearing assembly as claimed in claim 10 wherein the first lateral border and second medial border are formed of bronze.

12. A sealed bearing assembly as claimed in claim 7 wherein said first and second medial borders are circular.

13. A sealed bearing assembly as claimed in claim 12 wherein said first and second lateral borders are circular.

\* \* \* \* \*